United States Patent
Jacquemet et al.

(10) Patent No.: US 8,518,175 B2
(45) Date of Patent: Aug. 27, 2013

(54) USE OF CO-GRINDING AGENTS IN A PROCESS TO MANUFACTURE CO-GROUND NATURAL AND PRECIPITATED CALCIUM CARBONATES, SUSPENSIONS AND DRY PIGMENTS OBTAINED AND THEIR USES

(75) Inventors: Christian Jacquemet, Lyons (FR); Jacques Mongoin, Quincieux (FR)

(73) Assignee: Coatex S.A.S., Genay (FR)

( * ) Notice: Subject to any disclaimer, the term of this patent is extended or adjusted under 35 U.S.C. 154(b) by 0 days.

(21) Appl. No.: 13/568,658

(22) Filed: Aug. 7, 2012

(65) Prior Publication Data
US 2012/0302689 A1 Nov. 29, 2012

Related U.S. Application Data

(63) Continuation of application No. 12/085,318, filed as application No. PCT/IB2006/003806 on Dec. 19, 2006, now Pat. No. 8,282,730.

(30) Foreign Application Priority Data

Dec. 30, 2005 (FR) ..................................... 05 13504

(51) Int. Cl.
*C09C 1/02* (2006.01)
*C09C 3/04* (2006.01)
*B02C 23/06* (2006.01)

(52) U.S. Cl.
USPC ............................ 106/464; 106/465; 524/425

(58) Field of Classification Search
USPC .................................. 106/464, 465; 524/425
See application file for complete search history.

(56) References Cited

U.S. PATENT DOCUMENTS

| | | | |
|---|---|---|---|
| 4,554,307 A | 11/1985 | Farrar et al. | |
| 4,840,985 A * | 6/1989 | Gonnet et al. | 524/425 |
| 4,868,228 A | 9/1989 | Gonnet et al. | |
| 5,879,442 A * | 3/1999 | Nishiguchi et al. | 106/464 |
| 6,087,404 A | 7/2000 | Bown et al. | |
| 2004/0077762 A1 * | 4/2004 | Mongoin et al. | 524/430 |
| 2004/0097674 A1 * | 5/2004 | Suau et al. | 526/222 |
| 2004/0250970 A1 | 12/2004 | Qiu et al. | |
| 2005/0159568 A1 | 7/2005 | Suau et al. | |
| 2005/0234176 A1 | 10/2005 | Mongoin et al. | |
| 2008/0308010 A1 | 12/2008 | Rainer et al. | |
| 2009/0056896 A1 | 3/2009 | Jacquemet et al. | |

FOREIGN PATENT DOCUMENTS

| | | |
|---|---|---|
| EP | 0850880 A1 | 7/1998 |
| WO | 2004016566 A1 | 2/2004 |

OTHER PUBLICATIONS

Loiseau et al. "Macromolecules", vol. 36, pp. 3066-3077, 2003.
Geffroy et al. "Colloids and Surfaces," vol. 162, pp. 107-121, 2000.

* cited by examiner

*Primary Examiner* — Kelechi Egwim
(74) *Attorney, Agent, or Firm* — Amster, Rothstein & Ebenstein LLP

(57) ABSTRACT

The invention consists in the use, in a process of manufacture of GCC and PCC co-ground in water, of a co-grinding agent characterized in that:

a) it is constituted by a least one homopolymer and/or at least one copolymer of acrylic acid, which is partially neutralised, of which the rate of molar neutralization is less than 75% of the total acid functions, b) and in that it is introduced:

during the stage of preparation of the aqueous suspensions of GCC and PCC, and/or during stage 2) of co-grinding, and possibly during the stage of co-grinding and another stage of concentration, and possibly during this other stage of concentration.

The invention also lies in the resulting aqueous suspensions of GCC and PCC, in the dry pigments of GCC and PCC obtained, and in the use of these products in paper, paint, rubber and plastic.

20 Claims, No Drawings

USE OF CO-GRINDING AGENTS IN A PROCESS TO MANUFACTURE CO-GROUND NATURAL AND PRECIPITATED CALCIUM CARBONATES, SUSPENSIONS AND DRY PIGMENTS OBTAINED AND THEIR USES

CROSS-REFERENCE TO RELATED APPLICATIONS

This is a continuation of U.S. application Ser. No. 12/085,318, filed May 21, 2008 now U.S. Pat. No. 8,282,730, which is a U.S. national phase of PCT Application No. PCT/IB2006/003806, filed Dec. 19, 2006, which claims priority to French Application No. 05 13504, filed Dec. 30, 2005, the contents of which is hereby incorporated by reference.

The technical field of the invention is constituted by the processes to manufacture natural and precipitated calcium carbonates co-ground in water.

More particularly, this field is constituted by the co-grinding agents which are used in such processes for co-grinding in water of natural and precipitated calcium carbonates, A first object of the invention consists in the use, in a process to manufacture co-ground natural and precipitated calcium carbonates, comprising the following stages:
1. preparation
   (a) of an aqueous suspension of natural calcium carbonate, possibly comprising at least one dispersing agent and/or at least one grinding aid agent,
   (b) and an aqueous suspension of precipitated calcium carbonate, possibly comprising at least one dispersing agent,
2. co-grinding of the said aqueous suspensions of natural and precipitated calcium carbonates, as prepared in stage 1),
3. possibly, concentration of the aqueous suspension of the co-ground natural and precipitated calcium carbonates, as obtained after stage 2),
4. possibly, drying of the aqueous suspension of the co-ground natural and precipitated calcium carbonates, as obtained after stage 2) or 3), of a co-grinding agent, characterised in that:
   a) it is constituted by a least one homopolymer and/or at least one copolymer of acrylic acid, which is partially neutralised, and of which the rate of molar neutralisation of the acid functions is less than 75% of the total acid functions,
   b) and in that it is introduced:
      between stage 1) and stage 2) into the aqueous suspension of natural calcium carbonate prepared in stage 1a) and/or into the aqueous suspension of precipitated calcium carbonate prepared in stage 1b) and/or into a blend of these two suspensions,
      and/or during stage 2) of co-winding,
      and possibly between stage 2) and stage 3),
      and possibly during stage 3).

A second object of the invention lies in the aqueous suspensions of co-ground natural and precipitated calcium carbonates, obtained by the operation of co-grinding of the aqueous suspension of natural calcium carbonate and of the aqueous suspension of precipitated calcium carbonate, and which can also be obtained after the possible stage of concentration of the aqueous suspension resulting from the co-grinding stage.

A third object of the invention lies in the dry pigments of natural and precipitated calcium carbonates which are co-ground and then result from the drying operation.

A fourth object of the invention lies in the use of the co-ground aqueous suspensions of natural and precipitated calcium carbonates, in the field of paper, and notably in paper coatings and in the manufacture of sheet paper, and of paint.

A final object of the invention lies in the use of the dry pigments of aqueous suspensions of natural and precipitated calcium carbonates which are co-ground and then dried, in the field of paper, and notably in paper slips and in the manufacture of sheet paper, paint, plastics and rubbers.

Throughout the present Application, the Applicant indicates that a dispersing agent is used in a process to disperse mineral matter which does not involve the reduction of the size of the said mineral matter, whereas a grinding agent (or co-grinding agent) is used in a grinding (or co-grinding) process which involves a reduction of the size of the said mineral matter.

The term co-grinding (and the term co-grinding agent) is used when the grinding process uses at least two types of mineral matter of different natures, in contrast to a grinding process which consists in grinding a single mineral matter.

Calcium carbonate has been used for many years in the fields of paper, plastic, rubber and paint. It is either of natural origin and then ground, and in this case the term ground natural calcium carbonate, or GCC, is used, or it is of synthetic origin, and the term precipitated calcium carbonate, or PCC, is used.

For several years there has been a demand to supply calcium carbonate in the form of an aqueous suspension, containing both natural and precipitated calcium carbonate. This demand exists notably in the paper manufacturing sector, since the joint presence of GCC and PCC in paper coatings produced from aqueous suspensions of calcium carbonate enables the manufacturer of paper to regulate precisely certain end properties of a sheet of paper.

Thus, the documents "PCC or GCC, factors determining calcium carbonate choice in alkaline conversion" (published following the Nov. 1995 28 Pulp and Paper Annual Meeting), "GCC vs. PCC as the primary filler for uncoated and coated wood-free paper" (Tappi Journal 2000, 83(5), pp 76) or again "Chalk: a calcium carbonate for the high-filled sheet" (TAPPI Proceedings, Apr. 5-8, 1992, Papermakers Conference, Book 2, Opryland Hotel, Nashville Tenn., TAPPI Press, pp. 515-520), mention the use of aqueous suspensions of natural and precipitated calcium carbonates to produce paper coatings. In the document "Coating structure with calcium carbonate pigments and its influence on paper and print gloss" (Pulp & Paper Canada, 2004, 105(9), pp. 43-46), the influence of different blends of GCC and PCC on the brightness and printability properties of a sheet of paper coated by paper coatings containing the said blends is even discussed. With a view to manufacturing such aqueous suspensions of GCC and PCC, the skilled man in the art is familiar with a number of documents which describe simple blends between an aqueous suspension of natural calcium carbonate and an aqueous suspension of precipitated calcium carbonate.

Thus, document WO 2004/016 566 describes a method to prepare a pigmentary compound which consists in mixing in water a PCC having a particle diameter (by weight) of less than 1.6 µm and a GCC having a particle diameter (by weight) of less than 0.8 µm, in a GCC:PCC mass ratio ranging from 3:2 to 1:9. In addition, it is indicated that a dispersing agent with a sodium polyacrylate base can be used in the preparation of the initial aqueous suspensions of GCC and PCC ([0018] and [0019]). Such a pigmentary compound is then used in the manufacture of paper coatings which enable sheets of paper to be coated, the brightness and opacity properties of which are improved.

The skilled man in the art is also familiar with document DE 4 128 570, the object of which consists of a carbonated filler, usable both in paper coatings and in mass fillers, and leading to improved whiteness and opacity properties. This carbonated filler is characterised in that the particles which constitute it have a round or rhombohedral shape, in that they have a factor of distribution of granulometric sizes (an average diameters ratio such that 50% and 20% by weight of particles have a diameter less than this average diameter) of between 1.1 and 1.4, in that they have a ratio R (% by weight of particles the diameter of which is less than 1 μm/% by weight of particles, the diameter of which is less than 0.2 μm) of between 8 and 19, and in that they have an average diameter of between 0.4 and 1.5 μm. This filler has a natural and/or precipitated calcium carbonate base, possibly in the form of an aqueous suspension, which may contain a dispersing agent with a sodium polyacrylate base (as indicated in column 6, lines 52-55).

The skilled man in the art is also familiar with document WO 2004/059 079, which describes a pigmentary compound, usable for the manufacture of paper coatings, and which comprises a GCC and a PCC which both have a distribution factor ($100 \times d_{30}/d_{70}$, where $d_x$ designates the average diameter such that x % by weight of the particles have an average diameter less than this average diameter). This compound results from the blend of the two calcium carbonates of different origin in an aqueous medium, and the resulting aqueous suspension of mineral matter may contain a dispersing agent; the said dispersing agent is chosen from among the polyacrylate salts (such as a sodium or aluminium salt), a sodium hexametaphosphate, a non-ionic polyol compound, phosphoric acid, non-ionic surfactants, or the alcanolamines.

Finally, the skilled man in the art is familiar with document EP 1 347 835, which describes the use of homopolymers or copolymers of acrylic acid as a dispersing agent or grinding agent of mineral matter, where the said homopolymers or copolymers have a molar percentage of non-neutralised active acid sites of between 10% and 60%, and a percentage of the active acid sites neutralised by at least one neutralisation agent which is at least bi-functional of between 10% and 80%, and where the remainder of the 100% of the polymer's active acid sites are neutralised by mono-functional neutralisation agents. This document describes only grindings of GCC or dispersions of PCC: it therefore teaches the skilled man in the art nothing concerning the processes of co-grinding of GCC and PCC. Moreover, it tends to resolve a technical problem very far removed from that forming the subject of the present Application: the purpose is, indeed, to reduce the quantity of grinding agent or dispersing agent which is not adsorbed at the surfaces of mineral particles in aqueous suspension, which harms the printability properties of the paper manufactured from such suspensions.

Consequently, none of these 4 documents reveals a process of manufacture of natural and precipitated calcium carbonates by co-grinding. In addition, these 4 documents teach only the use of dispersing agents well known to the skilled man in the art and described in a very general fashion, in a process of simple blending between an aqueous suspension of GCC and an aqueous suspension of PCC.

With a view to manufacturing aqueous suspensions of GCC and PCC, the skilled man in the art is also familiar with a number of documents which describe an operation of co-grinding of natural calcium carbonate and precipitated calcium carbonate.

He is notably familiar with unpublished French patent application No. 05 077 111, the technical problem of which lies in the provision of an aqueous suspension of GCC and PCC, with a view to improving the brightness of papers coated by paper coatings containing the said suspensions. This document describes a process of co-grinding of GCC and PCC, leading to an aqueous suspension of natural and precipitated calcium carbonates, of which at least 80% by weight of the particles have an average diameter of less than 1 μm, and of which the specific BET area is less than 25 $m^2/g$.

He is also familiar with unpublished French patent application No. 05 077 113, the process of which that it describes enables the energy yield to be improved in the manufacture of an aqueous suspension of GCC and PCC. This process is based notably on a stage of co-grinding of GCC and PCC, in order to lead to an aqueous suspension of natural and precipitated calcium carbonate, having a distribution factor ($100 \times d_{30}/d_{70}$, as defined above) at least equal to 30.

He is also familiar with unpublished French patent application No. 05 077 112, describing a process of grinding which, through the use of particular grinding bodies having a base of beads of zirconium oxide stabilised by cerium oxide, enables mineral matter to be ground under high pH, temperature and pressure conditions. This patent application indicates that the mineral matter in question may be natural and precipitated calcium carbonates, which are then co-ground.

These 3 documents reveal that a dispersing agent and/or grinding aid agent may be used during or after the stage of co-grinding, in a quantity at most equal to 2% by dry weight of agent relative to the dry weight of mineral matter. In this instance nothing is indicated or suggested concerning the chemical nature of the said agent.

And the skilled man in the art wishing to use a process to manufacture an aqueous suspension of natural and precipitated calcium carbonates implementing a stage of co-grinding of GCC and PCC, is faced with the following triple technical problem:

he seeks to increase the dry extract of the aqueous suspension obtained after co-grinding, i.e. the percentage by dry weight of mineral matter relative to the total weight of the suspension, for economic reasons: the higher this dry extract, the greater the quantity of calcium carbonate given to the end client; this dry extract must be greater than 70%, preferentially greater than 72%, and very preferentially greater than 74%;

he seeks to obtain an aqueous suspension of mineral matter after the stage of co-grinding which is stable over time, for reasons relating to questions of stability of the said suspension during storage; this is reflected in a Brookfield™ viscosity measured after the co-grinding stage (at 25° C. and at 10 RPM) of less than 5,000 mPa·s, preferentially less than 3,000 mPa·s, and very preferentially less than 2,000 mPa·s, and a Brookfield™ viscosity measured 8 days after the stage of co-grinding and after stirring (at 25° C. and at 10 RPM) of less than 50,000 mPa·s, preferentially less than 30,000 mPa·s, and very preferentially less than 20,000 mPa·s;

finally, he seeks to obtain the finest possible particles of calcium carbonate, since this fineness generally improves certain optical properties of the coated sheet of paper, such as the brightness; he seeks to obtain particles of calcium carbonate the median diameter of which is less than 0.7 μm, preferentially less than 0.5 μm, and very preferentially less than 0.3 μm.

From this perspective, none of the documents of the state of the technique mentioned hitherto by the Applicant either teaches him a solution or suggests one to him, since all of him are intended to resolve different technical problems. In addition, the teaching which the skilled man in the art may derive from these documents in terms of the grinding aid agents remains very general, and in no way reveals the particular use of at least one homopolymer and/or at least one copolymer of acrylic acid, which is partially neutralised, and of which the molar neutralisation of the acid functions is less than 75% of the totality of the acid functions.

Finally, the Applicant is familiar with document EP 0 850 880, which describes a process to manufacture aqueous suspensions of calcium carbonate, having a high dry extract and a satisfactory stability. The real technical problem resolved by this document is in fact to prevent (as acknowledged by its authors, on page 3, lines 33-47) the problems relating to the use of natural calcium carbonate initially ground in an aqueous suspension, and then blended with precipitated calcium carbonate in an aqueous suspension: the said suspension would then have too high a viscosity. The solution proposed in this document is a process consisting in blending an aqueous suspension of PCC containing a viscosity-reducing agent with an aqueous suspension of GCC which has been dry ground, in adding a viscosity-reducing agent, and finally in grinding the Obtained suspension. A reading of the examples in this document demonstrates that the mineral particles of calcium carbonate resulting from the stage of co-grinding are very coarse particles compared to those obtained in the present invention: their median diameter is between 0.85 and 2.2 µm. And the skilled man in the art seeking here to obtain particles of calcium carbonate with an average diameter of less than 0.7 µm, preferentially less than 0.5 µm, and very preferentially less than 0.3 µm, knows that the effect of such a reduction of the size of the mineral particles will be to increase substantially the viscosity of the suspensions obtained if one wishes to maintain their dry extract at a constant degree or, conversely, will oblige him to reduce substantially the dry extract of these suspensions, if he wishes to maintain their viscosity constant. Such a document, therefore, teaches him nothing on the subject of the triple problem mentioned above, posed for the skilled man in the art. Finally, the Applicant is keen to emphasise that in document EP 0 850 880 the only viscosity-reducing agent mentioned is a sodium polyacrylate, as indicated in comparative example No. 1. Apart from the fact that such an agent does not reveal the chemical characteristics of the polymers of which use is made in the present invention, the very term viscosity-reducing agent indicates that its function is that of a dispersing agent. And, as will be seen notably in the examples, the polymers used in the present invention act as co-grinding agents.

Thus, the skilled man in the art wishing to use a process to manufacture an aqueous suspension of GCC and PCC implementing a stage of co-grinding of GCC and PCC, and faced with the following triple technical problem:

obtaining a dry extract greater than 70%, preferentially greater than 72%, and very preferentially greater than 74% (by dry weight of GCC and PCC relative to the total weight of the suspension);

obtaining for this same suspension a Brookfield™ viscosity measured after the stage of co-grinding (at 25° C. and at 10 RPM) of less than 5,000 mPa·s, preferentially less than 3,000 mPa·s, and very preferentially less than 2,000 mPa·s, and Brookfield™ viscosity measured 8 days after the stage of co-grinding and after stirring (at 25° C. and at 10 RPM) of less than 50,000 mPa·s, preferentially less than 30,000 mPa·s, and very preferentially less than 20,000 mPa·s;

obtaining, in this same suspension, particles of calcium carbonate the median diameter of which is less than 0.7 µm, and preferentially less than 0.3 µm;

has developed, in a completely surprising manner, the use in a process of co-grinding of GCC and PCC, comprising the stages of:

1. preparation
   (a) of an aqueous suspension of GCC, possibly comprising at least one dispersing agent and/or at least one grinding aid agent,
   (b) and an aqueous suspension of PCC, possibly comprising at least one dispersing agent,
2. co-grinding of the said aqueous suspensions of natural and precipitated calcium carbonates, as prepared in stage 1),
3. possibly, concentration of the aqueous suspension of the co-ground natural and precipitated calcium carbonates, as obtained after stage 2),
4. possibly, drying of the aqueous suspension of the co-ground natural and precipitated calcium carbonates, as obtained after stage 2) or 3), of a co-grinding agent, characterised in that:
   (a) it is constituted by a least one homopolymer and/or at least one copolymer of acrylic acid, which is partially neutralised, and of which the rate of molar neutralisation of the acid functions is less than 75% of the total acid functions,
   (b) and in that it is introduced:
      between stage 1) and stage 2), into the aqueous suspension of GCC prepared in stage 1a) and/or into the aqueous suspension of PCC prepared in stage 1b) and/or into a blend of these two suspensions,
      and/or during stage 2) of co-grinding,
      and possibly between stage 2) and stage 3),
      and possibly during stage 3).

This use of a co-grinding agent is also characterised in that 0.5% to 2% by dry weight of the said agent is used, relative to the total weight of GCC and PCC.

This use of a co-grinding agent is also characterised in that the said agent has a molar neutralisation rate of the acid functions of less than 75%, preferentially less than 50%, and very preferentially less than 20% of the totality of the acid functions.

This uses also characterised in that the said agent is neutralised by sodium and potassium hydroxides, carbonates and acid carbonates, calcium and magnesium hydroxides or oxides, ammonium hydroxide or their blends, preferentially by sodium and potassium hydroxides, carbonates and acid carbonates, ammonium hydroxide and their blends, and very preferentially by sodium hydroxide.

This use is also characterised in that the said agent has a molecular weight of between 4,000 g/mole and 15,000 g/mole, and preferentially of between 4,000 g/mole and 10,000 g/mole.

This use is also characterised in that the said agent has a polydispersity index of between 1.5 and 3.5, and preferentially between 1.5 and 2.5.

The Applicant indicates that in the present Application the molecular weight of the polymers used, and their polydispersity index, are determined using the GPC (Gel Permeability Chromatography) method, using a liquid chromatography device of Waters™ brand fitted, with two detectors, one of which combines dynamic diffusion of light with viscometry measured using a Viscotek™ viscometer, the other being a detector of refractometric concentration of Waters™ brand.

This liquid chromatography equipment is fitted with steric exclusion columns suitably chosen by the skilled man in the art in order to separate the different molecular weights of the polymers studied.

The elution liquid phase is an aqueous phase.

In a detailed manner, 1 ml of the polymerisation solution is sampled and placed on a capsule, and then evaporated at ambient temperature in a vacuum of less than 1 mm of mercury. The solute is diluted at 0.9% in the eluent of the GPC, and the combination is then injected in the GPC device. The eluent of the GPC is an $NaHCO_3$ solution: 0.08 mole/l, $NaNO_3$: 0.1 mole/l, triethanolamine: 0.02 mole/l, $NaN_3$ 0.03% by mass. The GPC column contains an isocratic pump (Waters 515) the flow rate of which is regulated at 0.5 ml/min., a kiln containing a precolumn of the "Guard Column Ultrahydrogel Waters™" type, a linear column of the "Ultrahydrogel Waters™" type measuring 30 cm in length and of 7.8 mm internal diameter, and a refractometric detector of the RI Waters™ 410 type. The kiln is heated to a temperature of 60° C. and the refractometer heated to a temperature of 50° C. The GPC device is calibrated by a series of 5 sodium polyacrylate standards supplied by Polymer Standard Service, and of polydispersity index between 1.4 and 1.7, together with a sodium polyacrylate of polydispersity index equal to 2.4 and of molecular weight equal to 5,600 g/mole.

This use is also characterised in that the said agent, when it is a copolymer of acrylic acid, has at least one monomer other than acrylic acid chosen from among the ethylenic unsaturation monomers with a monocarboxylic function, such as methacrylic acid, or again the diacid hemiesters such as the $C_1$ to $C_4$ monoesters of maleic or itaconic acid, or their blends, or chosen from among the ethylenic unsaturation monomers with a dicarboxylic function, such as crotonic, isocrotonic, cinnamic, itaconic or maleic acid, or again the carboxylic acid anhydrides, such as maleic anhydride, or chosen from among the ethylenic unsaturation monomers with a sulfonic function, such as 2-acrylamido-2-methyl-propane-sulfonic acid, sodium methallylsulfonate, sulfonic vinyl acid, and sulfonic styrene acid, or again chosen from among the ethylenic unsaturation monomers with a phosphoric function, such as phosphoric vinyl acid, ethylene glycol methacrylate phosphate, propylene glycol methacrylate phosphate, ethylene glycol acrylate phosphate, propylene glycol acrylate phosphate and their ethoxylates, or again chosen from the ethylenic unsaturation monomers with a phosphonic function, such as phosphonic vinyl acid, or their blends.

This co-grinding agent, which is a homopolymer or a copolymer of acrylic acid, is obtained by processes of radical polymerisation in solution, in a direct or reverse emulsion, in suspension or in precipitation in appropriate solvents, in the presence of known catalytic systems and transfer agents, or again by controlled radical polymerisation processes such as the method known as Reversible Addition Fragmentation Transfer (RAFT), the method known as Atom Transfer Radical Polymerization (ATRP), the method known as Nitroxide Mediated Polymerization (NMP) or again the method known as Cobaloxime Mediated Free Radical Polymerization.

This co-grinding agent, which is thus derived from a polymerisation reaction, may possibly be treated and separated into several phases, using static or dynamic processes known to the skilled man in the art, by one or more polar solvents belonging notably to the group constituted by water, methanol, ethanol, propanol, isopropanol, the butanols, acetone, tetrahydrofuran or their blends.

In a particular embodiment, the Applicant has observed that the choice of particular dispersion agents used for the preparation of the aqueous suspension of PCC in stage 1b) enables the end properties of the aqueous suspension of GCC and PCC derived from stages 2) and 3) to be improved advantageously, in terms of dry extract (% by total dry weight of GCC and PCC relative to the total weight of the suspension), of Brookfield™ viscosities measured after the stage of co-grinding and after 8 days after stirring (at 25° C. and at 10 rpm), and of median diameter of the particles of GCC and PCC.

More specifically, this means that, in this particular embodiment, it is possible to improve at least one of the parameters mentioned in the above paragraph, whilst maintaining the others constant.

Therefore, according to this particular embodiment, the use of co-grinding agents according to the invention is characterised in that the aqueous suspension of PCC prepared during stage 1b) contains at least one dispersing agent of PCC which is a homopolymer and/or a copolymer of acrylic acid, combining all the following characteristics:

it has a molar neutralisation rate of the acid functions greater than 80%, and preferentially greater than 90%, of the totality of the acid functions, and it is very preferentially totally neutralised;

it has a molecular weight of between 10,000 g/mole and 15,000 g/mole, and preferentially between 12,000 g/mole and 14,000 g/mole;

it has a polydispersity index of between 1.5 and 2.5.

According to this embodiment, the use of co-grinding agent according to the invention is also characterised in that, in the aqueous suspension of PCC prepared in stage 1b), 0.5% to 2%, and preferentially 0.5% to 1%, by dry weight of the said dispersion agent of FCC is used, relative to the dry weight of FCC.

According to this embodiment, the said dispersing agent used in the suspension of FCC prepared in stage 1b) is neutralised by sodium or potassium hydroxides, carbonates or acid carbonates, ammonium hydroxide or their blends, and preferentially by sodium hydroxide. According to this embodiment, the said dispersing agent used in the suspension of FCC prepared in stage 1b), when it is a copolymer of acrylic acid, has at least one monomer other than acrylic acid chosen from among the ethylenic unsaturation monomers with a monocarboxylic function, such as methacrylic acid, or again the diacid hemiesters such as the $C_1$ to $C_4$ monoesters of the maleic or itaconic acides, or their blends, or chosen from among the ethylenic unsaturation monomers with a dicarboxylic function, such as crotonic, isocrotonic, cinnamic, itaconic or maleic acid, or again the carboxylic acid anhydrides, such as maleic anhydride, or chosen from among the ethylenic unsaturation monomers with a sulfonic function, such as 2-acrylamido-2-methyl-propane-sulfonic acid, sodium methallylsulfonate, sulfonic vinyl acid, and sulfonic styrene acid, or again chosen from among the ethylenic unsaturation monomers with a phosphoric function, such as phosphoric vinyl acid, ethylene glycol methacrylate phosphate, propylene glycol methacrylate phosphate, ethylene glycol acrylate phosphate, propylene glycol acrylate phosphate and their ethoxylates, or again chosen from the ethylenic unsaturation monomers with a phosphonic function, such as phosphonic vinyl acid, or their blends.

This dispersion agent of PCC, which is a homopolymer or a copolymer of acrylic acid, is obtained by processes of radical polymerisation in solution, in a direct or reverse emulsion, in suspension or in precipitation in appropriate solvents, in the presence of known catalytic systems and transfer agents, or again by controlled radical polymerisation processes such as the method known as Reversible Addition Fragmentation Transfer (RAFT), the method known as Atom Transfer Radical Polymerization (ATRP), the method known as Nitroxide Mediated Polymerization (NMP) or again the method known as Cobaloxime Mediated Free Radical Polymerization.

This dispersion agent, which is thus derived from a polymerisation reaction, may possibly be treated and separated into several phases, according to static or dynamic processes known to the skilled man in the art, by one or more polar solvents belonging notably to the group constituted by water, methanol, ethanol, propanol, isopropanol, the butanols, acetone, tetrahydrofuran or their blends.

A second object of the invention lies in the aqueous suspensions of co-ground GCC and PCC, characterised in that they contain at least one co-grinding agent which consists of at least one homopolymer and/or of a least one copolymer of acrylic acid, which is partially neutralised, and of which the molar neutralisation rate of the acid functions is less than 75% of the totality of the acid functions.

These aqueous suspensions of co-ground GCC and PCC are also characterised in that they contain 0.5% to 2% by dry weight of the said co-grinding agent relative to the total dry weight of GCC and PCC.

These aqueous suspensions of co-ground GCC and PCC are also characterised in that the said co-grinding agent has a molar neutralisation rate of the acid functions of less than 75%, preferentially less than 50%, and very preferentially less than 20% of the totality of the acid functions.

These aqueous suspensions of co-ground GCC and PCC are also characterised in that the said co-grinding agent is neutralised by sodium and potassium hydroxides, carbonates and acid carbonates, calcium and magnesium hydroxides or oxides, ammonium hydroxide or their blends, preferentially by sodium and potassium hydroxides, carbonates and acid carbonates, ammonium hydroxide and their blends, and very preferentially by sodium hydroxide.

These aqueous suspensions of co-ground GCC and PCC are also characterised in that the said co-grinding agent has a molecular weight of between 4,000 g/mole and 15,000 g/mole, and preferentially between 4,000 g/mole and 10,000 g/mole.

These aqueous suspensions of co-ground GCC and PCC are also characterised in that the said co-grinding agent has a polydispersity index of between 1.5 and 3.5, and preferentially between 1.5 and 2.5.

These aqueous suspensions of co-ground GCC and PCC are also characterised in that the said co-grinding agent, when it is a copolymer of acrylic acid, has at least one other monomer than acrylic acid chosen from among the ethylenic unsaturation monomers with a monocarboxylic function, such as methacrylic acid, or again the diacid hemiesters such as the $C_1$ to $C_4$ monoesters of the maleic or itaconic acides, or their blends, or chosen from among the ethylenic unsaturation monomers with a dicarboxylic function, such as crotonic, isocrotonic, cinnamic, itaconic or maleic acid, or again the carboxylic acid anhydrides, such as maleic anhydride, or chosen from among the ethylenic unsaturation monomers with a sulfonic function, such as 2-acrylamido-2-methyl-propane-sulfonic acid, sodium methallylsulfonate, sulfonic vinyl acid, and sulfonic styrene acid, or again chosen from among the ethylenic unsaturation monomers with a phosphoric function, such as phosphoric vinyl acid, ethylene glycol methacrylate phosphate, propylene glycol methacrylate phosphate, ethylene glycol acrylate phosphate, propylene glycol acrylate phosphate and their ethoxylates, or again chosen from the ethylenic unsaturation monomers with a phosphonic function, such as phosphonic vinyl acid, or their blends.

This co-grinding agent, which is a homopolymer or a copolymer of acrylic acid, is obtained by processes of radical copolymerisation in solution, in a direct or reverse emulsion, in suspension or in precipitation in appropriate solvents, in the presence of known catalytic systems and transfer agents, or again by controlled radical polymerisation processes such as the method known as Reversible Addition Fragmentation Transfer (RAFT), the method known as Atom Transfer Radical Polymerization (ATRP), the method known as Nitroxide Mediated Polymerization (NMP) or again the method known as Cobaloxime Mediated Free Radical Polymerization.

This co-grinding agent, which is thus derived from a polymerisation reaction, may possibly be treated and separated into several phases, using static or dynamic processes known to the skilled man in the art, by one or more polar solvents belonging notably to the group constituted by water, methanol, ethanol, propanol, isopropanol, the butanols, acetone, tetrahydrofuran or their blends.

These aqueous suspensions of co-ground GCC and PCC are also characterised in that they contain a percentage by dry weight of PCC relative to the total dry weight of GCC and PCC of between 10% and 90%, preferentially between 20% and 80%, and very preferentially between 30% and 70%.

These aqueous suspensions of co-ground GCC and PCC are also characterised in that they contain a percentage by total dry weight of PCC and GCC, relative to the total weight of the suspension, greater than 70%, preferentially greater than 72%, and very preferentially greater than 74%.

However, any means enabling aqueous suspensions of co-ground GCC and PCC containing the said co-grinding agent, and having a total dry weight percentage of GCC and PCC of less than 70% of the total weight of the suspension to be obtained, must be considered to be a technical equivalent.

These aqueous suspensions of co-ground GCC and PCC are also characterised in that the particles of GCC and PCC which they contain have a distribution factor ($100 \times d_{30}/d_{70}$, where $d_x$ designates the average diameter, such that x % by weight of the particles have a diameter of less than this average diameter) greater than 30, preferentially greater than 40, and very preferentially greater than 45.

These aqueous suspensions of co-ground GCC and PCC are also characterised in that the particles of GCC and PCC which they contain have a median diameter of less than 0.7 μm, preferentially less than 0.5 μm, and very preferentially less than 0.3 μm.

The Applicant indicates that the values of $d_x$ and of the median diameter are determined using a device of the Sedigraph™ 5100 type sold by the company MICROMERITICS™, by the methods well known to the skilled man in the art.

In a particular embodiment, these aqueous suspensions of co-ground GCC and PCC are also characterised in that they also contain at least one dispersing agent of PCC which is a homopolymer and/or a copolymer of acrylic acid, combining all the following characteristics:
  it has a molar neutralisation rate of the acid functions greater than 80%, and preferentially greater than 90%, of the totality of the acid functions, and is very preferentially totally neutralised;
  it has a molecular weight of between 10,000 g/mole and 15,000 g/mole, and preferentially between 12,000 g/mole and 14,000 g/mole;
  it has a polydispersity index of between 1.5 and 2.5.

According to this embodiment, these aqueous suspensions of co-ground GCC and PCC are also characterised in that they contain 0.5% to 2%, and preferentially 0.5% to 1%, by dry weight of the said dispersing agent of the PCC relative to the dry weight of PCC.

According to this embodiment, the said dispersion agent of PCC is neutralised by sodium or potassium hydroxides, carbonates or acid carbonates, ammonium hydroxide or their blends, and preferentially by sodium hydroxide.

According to this embodiment, these aqueous suspensions of co-ground GCC and PCC are also characterised in that the dispersion agent of PCC, when it is a copolymer of acrylic acid, has at least one monomer other than acrylic acid chosen from among the ethylenic unsaturation monomers with a monocarboxylic function, such as methacrylic acid, or again the diacid hemiesters such as the $C_1$ to $C_4$ monoesters of the maleic or itaconic acides, or their blends, or chosen from among the ethylenic unsaturation monomers with a dicarboxylic function, such as crotonic, isocrotonic, cinnamic, itaconic or maleic acid, or again the carboxylic acid anhydrides, such as maleic anhydride, or chosen from among the ethylenic unsaturation monomers with a sulfonic function, such as 2-acrylamido-2-methyl-propane-sulfnic acid, sodium methallylsulfonate, sulfonic vinyl acid, and sulfonic styrene acid, or again chosen from among the ethylenic unsaturation monomers with a phosphoric function, such as phosphoric vinyl acid, ethylene glycol methacrylate phosphate, propylene glycol methacrylate phosphate, ethylene glycol acrylate phosphate, propylene glycol acrylate phosphate and their ethoxylates, or again chosen from the ethylenic unsaturation monomers with a phosphonic function, such as phosphonic vinyl acid, or their blends.

This dispersion agent, which is a homopolymer or a copolymer of acrylic acid, is obtained by processes of radical copolymerisation in solution, in a direct or reverse emulsion, in suspension or in precipitation in appropriate solvents, in the presence of known catalytic systems and transfer agents, or again by controlled radical polymerisation processes such as the method known as Reversible Addition Fragmentation Transfer (RAFT), the method known as Atom Transfer Radical Polymerization (ATRP), the method known as Nitroxide Mediated Polymerization (NMP) or again the method known as Cobaloxime Mediated Free Radical Polymerization.

This dispersion agent, which is thus derived from a polymerisation reaction, may possibly be treated and separated into several phases, according to static or dynamic processes known to the skilled man in the art, by one or more polar solvents belonging notably to the group constituted by water, methanol, ethanol, propanol, isopropanol, the butanols, acetone, tetrahydrofuran or their blends.

A third object of the invention lies in the dry pigments of GCC and PCC obtained by the embodiment of the process according to the invention which uses a stage of drying of the aqueous suspensions of co-ground GCC and PCC.

The Applicant indicates that in the course of this stage, the skilled man in the art may use a treatment agent to treat the surface of the particles of co-ground GCC and PCC, such as notably an agent to make the said surface hydrophobic, an agent such as a fatty acid having 8 to 30 carbon atoms, where this agent may notably be stearic acid These dry pigments of co-ground GCC and PCC are also characterised in that they contain a percentage by dry weight of PCC relative to the total dry weight of GCC and PCC of between 10% and 90%, preferentially between 20% and 80%, and very preferentially between 30% and 70%.

These dry pigments are also characterised in that they contain at least one co-grinding agent of GCC and FCC which is at least one homopolymer and/or at least one copolymer of acrylic acid, which is partially neutralised, and of which the molar neutralisation rate of the acid functions is less than 75% of the totality of the acid functions.

These dry pigments are also characterised in that they contain 0.5% to 2% by dry weight of the said co-grinding agent of GCC and FCC relative to the total dry weight of GCC and PCC.

These dry pigments are also characterised in that the said co-grinding agent of GCC and PCC has a molar neutralisation rate of the acid functions of less than 75%, preferentially less than 50%, and very preferentially less than 20%, of the totality of the acid functions.

These dry pigments are also characterised in that the co-grinding agent of GCC and FCC is neutralised by sodium and potassium hydroxides, carbonates and acid carbonates, calcium and magnesium hydroxides or oxides, ammonium hydroxide or their blends, preferentially by sodium and potassium hydroxides, carbonates and acid carbonates, ammonium hydroxide and their blends, and very preferentially by sodium hydroxide.

These dry pigments are also characterised in that the co-grinding agent of GCC and PCC has a molecular weight of between 4,000 g/mole and 15,000 g/mole, and preferentially between 4,000 g/mole and 10,000 g/mole.

These dry pigments are also characterised in that the co-grinding agent of GCC and PCC has a polydispersity index of between 1.5 and 3.5, and preferentially between 1.5 and 2.5.

These dry pigments are also characterised in that the co-grinding agent of GCC and PCC, when it is a copolymer of acrylic acid, has at least one monomer other than acrylic acid chosen from among the ethylenic unsaturation monomers with a monocarboxylic function, such as methacrylic acid, or again the diacid hemiesters such as the $C_1$ to $C_4$ monoesters of the maleic or itaconic acides, or their blends, or chosen from among the ethylenic unsaturation monomers with a dicarboxylic function, such as crotonic, isocrotonic, cinnamic, itaconic or maleic acid, or again the carboxylic acid anhydrides, such as maleic anhydride, or chosen from among the ethylenic unsaturation monomers with a sulfonic function, such as 2-acrylamido-2-methyl-propane-sulfonic acid, sodium methallylsulfonate, sulfonic vinyl acid, and sulfonic styrene acid, or again chosen from among the ethylenic unsaturation monomers with a phosphoric function, such as phosphoric vinyl acid, ethylene glycol methacrylate phosphate, propylene glycol methacrylate phosphate, ethylene glycol acrylate phosphate, propylene glycol acrylate phosphate and their ethoxylates, or again chosen from the ethylenic unsaturation monomers with a phosphonic function, such as phosphonic vinyl acid, or their blends.

In a particular embodiment, these dry pigments are also characterised in that they also contain at least one dispersing agent of PCC which is a homopolymer and/or a copolymer of acrylic acid, combining all the following characteristics:
  it has a molar neutralisation rate of the acid functions greater than 80%, and preferentially greater than 90%, of the totality of the acid functions, and is very preferentially totally neutralised;
  it has a molecular weight of between 10,000 g/mole and 15,000 g/mole, and preferentially between 12,000 g/mole and 14,000 g/mole;
  it has a polydispersity index of between 1.5 and 2.5.

According to this embodiment, these dry pigments of GCC and PCC are also characterised in that they contain 0.5% to 2%, and preferentially 0.5% to 1%, by dry weight of the said dispersing agent of the PCC relative to the dry weight of PCC.

According to this embodiment, the said dispersion agent of PCC is neutralised by sodium or potassium hydroxides, carbonates or acid carbonates, ammonium hydroxide or their blends, and preferentially by sodium hydroxide.

According to this embodiment, these dry pigments of GCC and PCC are also characterised in that the dispersion agent of PCC, when it is a copolymer of acrylic acid, has at least one monomer other than acrylic acid chosen from among the ethylenic unsaturation monomers with a monocarboxylic function, such as methacrylic acid, or again the diacid hemiesters such as the $C_1$ to $C_4$ monoesters of the maleic or itaconic acides, or their blends, or chosen from among the ethylenic unsaturation monomers with a dicarboxylic function, such as crotonic, isocrotonic, cinnamic, itaconic or maleic acid, or again the carboxylic acid anhydrides, such as maleic anhydride, or chosen from among the ethylenic unsaturation monomers with a sulfonic function, such as 2-acrylamido-2-methyl-propane-sulfonic acid, sodium methallylsulfonate, sulfonic vinyl acid, and sulfonic styrene acid, or again chosen from among the ethylenic unsaturation monomers with a phosphoric function, such as phosphoric vinyl acid, ethylene glycol methacrylate phosphate, propylene glycol methacrylate phosphate, ethylene glycol acrylate phosphate, propylene glycol acrylate phosphate and their ethoxylates, or again chosen from the ethylenic unsaturation monomers with a phosphonic function, such as phosphonic vinyl acid, or their blends.

A fourth object of the invention lies in the use of aqueous suspensions of co-ground GCC and PCC according to the invention, in the manufacture of paper, and notably in coating of paper sheet and in the manufacture of paper sheet, and in the manufacture of paints.

A fifth object of the invention lies in the use of dry pigments of GCC and PCC having been co-ground and dried according to the invention, in the manufacture of paper, and notably in coating of paper sheet and in the manufacture of paper sheet, and in the manufacture of paints, rubbers and plastics.

EXAMPLES

In each of the examples, the granulometric characteristics of the aqueous suspensions of mineral matter are determined using a device of the Sedigraph™ 5100 type sold by the company MICROMERITICS™.

Example 1

This example illustrates the use, in the process of manufacture of co-ground GCC and PCC comprising the stages of:
1. preparation
    (a) of an aqueous suspension of GCC, with a grinding aid agent,
    (b) and of an aqueous suspension of PCC, comprising a dispersing agent,
2. co-grinding of the said aqueous suspensions of GCC and PCC, as prepared in stage 1),
3. concentration of the aqueous suspension of co-ground GCC and PCC, as obtained after stage 2), of a co-grinding agent according to the prior art or of a co-grinding agent according to the invention, where the same agent is introduced partly during stage 2), the other part being introduced during stage 3).

This example illustrates the case of a GCC:PCC ratio during the co-grinding stage equal to 50:50.

In addition, this example also illustrates the aqueous suspensions of co-ground GCC and PCC according to the invention.

According to stage 1a) of the said process, one begins by preparing an aqueous suspension of GCC according to the methods well known to the skilled man in the art, using 0.27% by dry weight of a polyacrylate relative to the dry weight of GCC.

This suspension:
    has a dry extract equal to 75.3% (expressed as a percentage by dry weight of GCC relative to the total weight of the suspension);
    has granulometric characteristics such that 41.9% by weight of the particles of GCC have a diameter of less than 1 µm, 66.2% by weight of the particles of GCC have a diameter of less than 2 µm, and such that the median diameter of the said particles of GCC is equal to 1.4 µm.

According to stage 1b) of the said process, an aqueous suspension of PCC is also prepared according to the methods well known to the skilled man in the art.

This suspension:
    has a dry extract equal to 51.8% (expressed as a percentage by dry weight of PCC relative to the total weight of the suspension);
    has granulometric characteristics such that 74.5% by weight of the particles of PCC have a diameter of less than 1 µm, 96.6% by weight of the particles of PCC have a diameter of less than 2 µm, and such that the median diameter of the said particles of PCC is equal to 0.71 µm;
    and contains 0.5% by dry weight (relative to the dry weight of PCC) of a dispersing agent which is a homopolymer of acrylic acid, totally neutralised by soda, of molecular weight equal to 10,000 g/mole, and of polydispersity index equal to 3.1; this agent does not therefore correspond to the particular embodiment of the invention, in which particularly advantageous dispersing agents are used to disperse the PCC (the definition of such agents having been given in the description of the present Application).

According to stage 2) of the said process, the two suspensions are then co-ground.

The GCC:PCC ratio by dry weight during this stage is equal to 50:50.

During this stage a quantity of co-grinding agent equal to 0.4% by dry weight relative to the total dry weight of GCC and PCC is introduced.

According to stage 3) of the said process, the aqueous suspension of co-ground GCC and PCC obtained after stage 2) is concentrated, by introducing the same agent as the one used during the co-grinding stage; the quantity of the said agent used during the stage of concentration is equal to 0.4% by dry weight relative to the total dry weight of GCC and PCC.

Test No. 1
    This test illustrates the prior art.
    It uses a co-grinding agent which is a homopolymer of acrylic acid, which is totally neutralised by sodium hydroxide, of molecular weight equal to 10,000 g/mole and of polydispersity index equal to 3.1.

Test No. 2
    This test illustrates the prior art.
    It uses a co-grinding agent which is a homopolymer of acrylic acid, of which 80% by mole of the acid functions are neutralised by sodium hydroxide, of molecular weight equal to 10,000 g/mole and of polydispersity index equal to 3.1.

Test No. 3
    This test illustrates the prior art.
    It uses a co-grinding agent which is a homopolymer of acrylic acid, of which 40% by mole of the acid functions are neutralised by sodium hydroxide, and 45% by mole of the acid functions are neutralised by calcium hydroxide, of molecular weight equal to 5,600 g/mole and of polydispersity index equal to 2.4, Test No. 4

This test illustrates the prior art.

It uses a co-ginding agent which is a homopolymer of acrylic acid, of which 50% by mole of the acid functions are neutralised by sodium hydroxide, and 35% by mole of the acid functions are neutralised by magnesium hydroxide, of molecular weight equal to 5,600 g/mole and of polydispersity index equal to 2.2.

the median diameter of the particles of GCC and PCC in the final suspension obtained after stage 3), noted $d_{50}$;

the dry extract of the final suspension obtained after stage 3) noted DE;

the Brookfield™ viscosities, measured at 10 RPM and at 25° C. according to the methods well known to the skilled man in the art, of the final suspension obtained after stage 3), at instant t=0 and noted $V_B$ ($t_0$), and at instant t=8 days after stirring, noted. $V_B$ ($t_8$).

All these results, together with the principal characteristics of the co-grinding agents used, are shown in table 1.

TABLE 1

|  |  | test No. | | | | | | | |
|---|---|---|---|---|---|---|---|---|---|
|  |  | 1 | 2 | 3 | 4 | 5 | 6 | 7 | 8 |
| prior art (PA)/invention (IN) | | PA | PA | PA | PA | INV | INV | INV | INV |
| co-grinding agent used during stages 2 and 3) | nature | aa | aa | aa | aa | aa | aa | aa/amps | aa |
|  | neutralisation | 100 Na | 80 Na | 40 Na 45 Ca | 50 Na 35 Mg | 14 Na | 40 Na 10 Ca | 30 Na 20 Ca | 37 Na |
|  | $M_w$ (g/mole) | 10,000 | 10,000 | 5,600 | 5,600 | 5,600 | 5,600 | 5,600 | 5,600 |
|  | $I_p$ | 3.1 | 3.1 | 2.4 | 2.2 | 2.4 | 2.4 | 2.35 | 2.2 |
| suspension of GCC and PCC obtained after stage 3) | % <1 μm | 90 | 92 | 98.9 | 98 | 97.9 | 97.9 | 96.1 | 97.9 |
|  | $d_{50}$ (μm) | 0.5 | 0.4 | 0.28 | 0.3 | 0.293 | 0.282 | 0.28 | 0.29 |
|  | DE (%) | 70.0 | 71.0 | 72.0 | 73.0 | 74.4 | 73.5 | 74.0 | 74.4 |
|  | $V_B$ ($t_0$) (mPa·s) | 7,000 | 6,000 | 6,700 | 18,600 | 4,260 | 3,800 | 4,240 | 3,460 |
|  | $V_B$ ($t_8$) (mPa·s) | 100,000 | 80,000 | 65,000 | 80,000 | 46,200 | 47,500 | 40,000 | 20,700 |

Test No. 5

This test illustrates the invention.

It uses a co-grinding agent which is a homopolymer of acrylic acid, of which 14% by mole of the acid functions are neutralised by sodium hydroxide, of molecular weight equal to 5,600 g/mole and of polydispersity index equal to 2.4.

Test No. 6

This test illustrates the invention.

It uses a co-grinding agent which is a homopolymer of acrylic acid, of which 40% by mole of the acid functions are neutralised by sodium hydroxide, and 10% by mole of the acid functions are neutralised by calcium hydroxide, of molecular weight equal to 5,600 g/mole and of polydispersity index equal to 2.4.

Test No. 7

This test illustrates the invention.

It uses a co-grinding agent which is a copolymer of acrylic acid and of 2-acrylamido-2-methyl-propane-sulfonic acid (in a mass ratio of these two constituents equal to 85:15), of which 30% by mole of the acid functions are neutralised by sodium hydroxide, and 20% by mole of the acid functions are neutralised by calcium hydroxide, of molecular weight equal to 5,600 and of polydispersity index equal to 2.35.

Test No. 8

This test illustrates the invention.

It uses a co-grinding agent which is a homopolymer of acrylic acid, of which 37% by mole of the acid functions are neutralised by sodium hydroxide, of molecular weight equal to 5,600 and of polydispersity index equal to 2.2.

For each of the tests No. 1 to 8, the following are then measured, according to the methods well known to the skilled man in the art:

the percentage by weight of particles of GCC and PCC in the final suspension obtained after stage 3), which have a diameter of less than 1 μm, noted % 1 μm;

characteristics of the co-grinding agents used, with:

"nature" designating the chemical nature of the said agent, and notably aa designating a homopolymer of acrylic acid and aa/amps designating a copolymer of acrylic acid and of 2-acrylamido-2-methyl-propane-sulfonic acid in a mass ratio of these two constituents equal to 85:15;

"neutralisation" indicating the molar percentage of the neutralised acid functions number) and the nature of the neutralisation ion (chemical symbol according to number)

"$M_w$" designating the molecular weight by mass of the said agent;

"$I_p$" designating the polydispersity index of the said agent; characteristics of the aqueous suspensions of GCC and PCC obtained after the stage of concentration, with:

"%<1 μm" designating the percentage by weight of particles of GCC and PCC having a diameter of less than 1 μm;

"$d_{50}$" designating the median diameter of the particles of GCC and PCC;

"DE (%)" designating the dry extract of the suspension (in % by total dry weight of GCC and PCC relative to the total weight of the suspension);

"$V_B$ ($t_0$)" and "$V_B$ ($t_8$)" designating respectively the Brookfield™ viscosities, measured at 10 RPM and at 25° C., at instant t=0 and at instant t=8 days after stirring.

These results therefore demonstrate that only the co-grinding agents of the invention enable the technical problem posed to the skilled man in the art to be resolved, namely:

obtaining for the final suspension of co-ground GCC and PCC a dry extract greater than 70%, preferentially greater than 72%, and very preferentially greater than 74% (by dry weight of mineral particles relative to the total weight of the suspension);

obtaining for this same suspension a Brookfield™ viscosity measured after the stage of co-grinding (at 25° C. and at 10 RPM) of less than 5,000 mPa·s, preferentially less than 3,000 mPa·s, and very preferentially less than 2,000 mPa·s, and a Brookfield™ viscosity measured 8 days after the stage of co-grinding and after stirring (at 25° C. and at 10 RPM) of less than 50,000 mPa·s, preferentially less than 30,000 mPa·s, and very preferentially less than 20,000 mPa·s;

obtaining, in this same suspension, particles of calcium carbonate the median diameter of which is less than 0.7 µm, preferentially less than 0.5 µm, and very preferentially less than 0.3 µm.

Example 2

This example illustrates the use, in the process of manufacture of co-ground GCC and PCC comprising the stages of:
1. preparation
   (a) of an aqueous suspension of GCC, with a grinding aid agent,
   (b) and of an aqueous suspension of PCC, comprising a dispersing agent,
2. co-grinding of the said aqueous suspensions of GCC and PCC, as prepared in stage 1),
3. concentration of the aqueous suspension of the co-ground GCC and PCC, as obtained after stage 2), of a co-winding agent according to the prior art or of a co-ginding agent according to the invention, where the same agent is introduced partly during stage 2), the other part being introduced during stage 3).

This example illustrates the case of a GCC:PCC ratio during the co-grinding stage equal to 70:30, In addition, this example also illustrates the aqueous suspensions of co-pound GCC and PCC according to the invention.

According to stage 1a) of the said process, one begins by preparing an aqueous suspension of GCC according to the methods well known to the skilled man in the art, using 0.27% by dry weight of a polyacrylate relative to the dry weight of GCC.

This suspension:
has a dry extract equal to 75.3% (expressed as a percentage by dry weight of GCC relative to the total weight of the suspension);
has granulometric characteristics such that 41.9% by weight of the particles of GCC have a diameter of less than 1 µm, 66.2% by weight of the particles of GCC have a diameter of less than 2 µm, and such that the median diameter of the said particles of GCC is equal to 1.4 µm.

According to stage 1b) of the said process, an aqueous suspension of PCC is also prepared according to the methods well known to the skilled man in the art.

This suspension:
has a dry extract equal to 51.8% (expressed as a percentage by dry weight of the particles of PCC relative to the total weight of the suspension);
has granulometric characteristics such that 74.5% by weight of the particles of PCC have an average diameter of less than 1 µm, 96.6% by weight of the particles of PCC have an average diameter of less than 2 µm, and such that the median diameter of the said particles of PCC is equal to 0.71 µm;
and contains 0.5% by dry weight (relative to the dry weight of PCC) of a dispersing agent which is a homopolymer of acrylic acid, totally neutralised by soda, of molecular weight equal to 10,000 g/mole, and of polydispersity index equal to 3.1; this agent does not therefore correspond to the particular embodiment of the invention in which particularly advantageous dispersing agents are used to disperse the PCC (the definition of such agents having been given in the description of the present Application).

According to stage 2) of the said process, the two suspensions are then co-ground.

The GCC:PCC ratio by dry weight during this stage is equal to 70:30.

During this stage a quantity of co-grinding agent equal to 0.4% by dry weight relative to the total dry weight of GCC and PCC used is introduced.

According to stage 3) of the said process, the aqueous suspension of co-ground GCC and PCC obtained after stage 2) is concentrated, by introducing the same agent as the one used during the co-grinding stage; the quantity of the said agent used during the stage of concentration is equal to 0.4% by dry weight relative to the total dry weight of GCC and PCC.

Test No. 9

This test illustrates the prior art.

It uses a co-grinding agent which is a homopolymer of acrylic acid, which is totally neutralised by sodium hydroxide, of molecular weight equal to 10,000 g/mole and of polydispersity index equal to 3.1.

Test No. 10

This test illustrates the prior art.

It uses a co-grinding agent which is a homopolymer of acrylic acid, of which 80% by mole of the acid functions are neutralised by sodium hydroxide, of molecular weight equal to 10,000 g/mole and of polydispersity index equal to 3.1.

Test No. 11

This test illustrates the invention.

It uses a co-grinding agent which is a homopolymer of acrylic acid, of which 40% by mole of the acid functions are neutralised by sodium hydroxide, and 10% by mole of the acid functions are neutralised by calcium hydroxide, of molecular weight equal to 5,600 g/mole and of polydispersity index equal to 2.4.

For each of the tests No. 9 to 11, the following are then measured, according to the methods well known to the skilled man in the art:
the percentage by weight of particles of GCC and PCC in the final suspension obtained after stage 3), which have a diameter of less than 1 µm, noted %<1 µm;
the median diameter of the particles of GCC and PCC in the final suspension obtained after stage 3), noted $d_{50}$;
the dry extract of the final suspension obtained after stage 3) noted DE;
the Brookfield™ viscosities, measured at 10 RPM and at 25° C., of the final suspension obtained after stage 3), at instant t=0 and noted $V_B(t_0)$, and at instant t=8 days after stirring, noted $V_B(t_8)$.

All these results, together with the principal characteristics of the co-grinding agents used, are shown in table 2.

TABLE 2

| | | test No. | | |
|---|---|---|---|---|
| | | 9 | 10 | 11 |
| | prior art (PA)/invention (IN) | PA | PA | INV |
| co-grinding agent used | nature | aa | aa | aa |
| | neutralisation | 100 Na | 80 Na | 40 Na 10 Ca |

TABLE 2-continued

|  |  | test No. | | |
|---|---|---|---|---|
|  |  | 9 | 10 | 11 |
| during stages 2 and 3) | $M_w$ (g/mole) | 10,000 | 5,600 | 5,600 |
|  | $I_p$ | 3.1 | 2.4 | 2.4 |
| suspension of GCC and PCC obtained after stage 3) | % < 1 µm | 90 | 98.9 | 97.9 |
|  | $d_{50}$ (µm) | 0.5 | 0.28 | 0.282 |
|  | DE (%) | 70.0 | 72.0 | 74.1 |
|  | $V_B(t_o)$ (mPa·s) | 6,500 | 6,200 | 3,200 |
|  | $V_B(t_8)$ (mPa·s) | 80,000 | 55,000 | 35,800 | characteristics of the co-grinding agents used, with:
  "nature" designating the chemical nature of the said agent, as designating a homopolymer of acrylic acid;
  "neutralisation" indicating the molar percentage of the neutralised acid functions (number) and the nature of the neutralisation ion (chemical symbol according to number);
  "$M_w$" designating the molecular weight by mass of the said agent;
  "$I_p$" designating the polydispersity index of the said agent;
characteristics of the aqueous suspensions of natural and precipitated calcium carbonates obtained after the stage of concentration, with:
  "%<1 µm" designating the percentage by weight of particles of GCC and PCC having a diameter of less than 1 µm;
  "$d_{50}$" designating the median diameter of the particles of GCC and PCC;
  "DE (%)" designating the dry extract of the suspension (in % by total dry weight of GCC and PCC relative to the total weight of the suspension);
  "$V_B(t_0)$" and "$V_B(t_8)$" designating respectively the Brookfield™ viscosities, measured at 10 RPM and at 25° C., at instant t=0 and at instant t=8 days after stirring.

These results therefore demonstrate that only the co-grinding agents of the invention enable the technical problem posed to the skilled man in the art to be resolved, namely:
  obtaining for the final suspension of co-ground GCC and PCC a dry extract greater than 70%, preferentially greater than 72%, and very preferentially greater than 74% (by dry weight of GCC and PCC relative to the total weight of the suspension);
  obtaining for this same suspension a Brookfield™ viscosity measured after the stage of co-grinding (at 25° C. and at 10 RPM) of less than 5,000 mPa·s, preferentially less than 3,000 mPa·s, and very preferentially less than 2,000 mPa·s, and a Brookfield™ viscosity measured 8 days after the stage of co-grinding and after stirring (at 25° C. and at 10 RPM) of less than 50,000 mPa·s, preferentially less than 30,000 mPa·s, and very preferentially less than 20,000 mPa·s;
  obtaining, in this same suspension, particles of calcium carbonate the median diameter of which is less than 0.7 µm, and preferentially less than 03 µm.

Example 3

This example illustrates the use, in the process of manufacture of co-ground GCC and PCC comprising the stages of:
1. preparation
   (a) of an aqueous suspension of GCC, with a grinding aid agent,
   (b) and of an aqueous suspension of PCC, comprising a dispersing agent,
2. co-grinding of the said aqueous suspensions of GCC and PCC, as prepared in stage 1),
3. concentration of the aqueous suspension of the co-ground natural and precipitated calcium carbonates, as obtained after stage 2),
of a co-grinding agent according to the invention, where the same agent is introduced partly during stage 2), the other part being introduced during stage 3).

This example illustrates the case of a GCC:PCC ratio during the co-grinding stage equal to 50:50.

In the case of tests 15 and 16 and also 17 and 18, this example illustrates the preferential embodiment which lies in the use, during stage 1b) of preparation of the suspension of FCC, of dispersing agents of the PCC which are homopolymers of acrylic acid, combining all the following characteristics:
  a molar neutralisation rate of the acid functions greater than 80%, and preferentially greater than 90%, of the totality of the acid functions, and the said agent is very preferentially totally neutralised;
  a molecular weight of between 10,000 g/mole and 15,000 g/mole, and preferentially between 12,000 g/mole and 14,000 g/mole;
  a polydispersity index of between 1.5 and 2.5.

Finally, this example also illustrates the aqueous suspensions of co-ground GCC and FCC according to the invention.

According to stage 1a) of the said process, one begins by preparing an aqueous suspension of GCC according to the methods well known to the skilled man in the art, using 0.27% by dry weight of a polyacrylate relative to the dry weight of GCC.

This suspension:
  has a dry extract equal to 75.3% (expressed as a percentage by dry weight of GCC relative to the total weight of the suspension);
  has granulometric characteristics such that 41.9% by weight of the particles of GCC have a diameter of less than 1 µm, 66.2% by weight of the particles of GCC have a diameter of less than 2 µm, and such that the median diameter of the said particles of GCC is equal to 1.4 µm;

According to stage 1b) of the said process, an aqueous suspension of PCC is also prepared according to the methods well known to the skilled man in the art.

This suspension:
  has a dry extract equal to 51.8% (expressed as a percentage by dry weight of FCC relative to the total weight of the suspension);
  has granulometric characteristics such that 74.5% by weight of the particles of PCC have a diameter of less than 1 µm, 96.6% by weight of the particles of PCC have a diameter of less than 2 µm, and such that the median diameter of the said particles of PCC is equal to 0.71 µm;
  and contains a dispersing agent (which illustrates the preferential embodiment of the invention in the case of tests No. 15 and 16, and also 17 and 18), in a quantity equal to 0.5% by dry weight of the said agent relative to the dry weight of PCC.

According to stage 2) of the said process, both suspensions are then co-ground according to the methods well known to the skilled man in the art.

The GCC:PCC ratio by dry weight during this stage is equal to 50:50.

During this stage a quantity of co-grinding agent equal to 0.4% by dry weight relative to the total dry weight of GCC and FCC is introduced.

According to stage 3) of the said process, the aqueous suspension of co-ground GCC and FCC obtained after stage 2) is concentrated, by introducing the same agent as the one used during the co-grinding stage; the quantity of the said agent used during the stage of concentration is equal to 0.5% by dry weight relative to the total dry weight of GCC and PCC.

Test No. 12

This test illustrates the invention, but does not illustrate the preferential embodiment which consists in the use of a particular dispersion agent for FCC, as defined in the introduction of this example.

It uses, during stage 1b) of preparation of the suspension of PCC, a homopolymer of acrylic acid, of which 50% by mole of the acid functions are neutralised by sodium hydroxide, and 50% by mole of the acid functions are neutralised by magnesium hydroxide, of molecular weight equal to 5,700 g/mole and of polydispersity index equal to 2.2.

It also uses, during stages 2) and 3), a co-grinding agent which is a homopolymer of acrylic acid, of which 37% of the acid functions are neutralised by sodium hydroxide, of molecular weight equal to 5,600 g/mole and of polydispersity index equal to 2.2.

Test No. 13

This test illustrates the invention, but does not illustrate the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 4,500 g/mole and of polydispersity index equal to 2.2.

It also uses, during stages 2) and 3), a co-grinding agent which is a homopolymer of acrylic acid, of which 14% by mole of the acid functions are neutralised by sodium hydroxide, of molecular weight equal to 5,600 g/mole and of polydispersity index equal to 2.4.

Test No. 14

This test illustrates the invention, but does not illustrate the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 5,500 g/mole and of polydispersity index equal to 2.4.

It also uses, during stages 2) and 3), a co-grinding agent which is a homopolymer of acrylic acid, of which 14% by mole of the acid functions are neutralised by sodium hydroxide, of molecular weight equal to 5,600 g/mole and of polydispersity index equal to 2.4.

Test No. 15

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% of the acid functions are neutralised by sodium hydroxide, of molecular weight equal to 12,000 g/mole and of polydispersity index equal to 2.2.

It also uses, during stages 2) and 3), a co-grinding agent which is a homopolymer of acrylic acid, of which 14% of the acid functions are neutralised by sodium hydroxide, of molecular weight equal to 5,600 g/mole and of polydispersity index equal to 2.4.

Test No. 16

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% of the acid functions are neutralised by sodium hydroxide, of molecular weight equal to 12,000 g/mole and of polydispersity index equal to 2.2.

It also uses, during stages 2) and 3), a winding agent which is a homopolymer of acrylic acid, of which 26% by mole of the acid functions are neutralised by sodium hydroxide, of molecular weight equal to 5,800 g/mole and of polydispersity index equal to 2.15.

Test No. 17

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 90% of the acid functions are neutralised by sodium hydroxide, of molecular weight equal to 12,000 g/mole and of polydispersity index equal to 2.2. It also uses, during stages 2) and 3), a co-grinding agent which is a homopolymer of acrylic acid, of which 14% of the acid functions are neutralised by sodium hydroxide, of molecular weight equal to 5,600 g/mole and of polydispersity index equal to 2.4.

Test No. 18

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% of the acid functions are neutralised by sodium hydroxide, of molecular weight equal to 13,000 g/mole and of polydispersity index equal to 2.2.

It also uses, during stages 2) and 3), a grinding agent which is a homopolymer of acrylic acid, of which 26% by mole of the acid functions are neutralised by sodium hydroxide, of molecular weight equal to 5,800 g/mole and of polydispersity index equal to 2.15.

For each of the tests No. 12 to 18, the following are then measured, according to the methods well known to the skilled man in the art:
- the percentage by weight of particles of GCC and PCC in the final suspension obtained after stage 3), which have a diameter of less than 1 μm, noted %<1 μm;
- the median diameter of the particles of GCC and PCC in the final suspension obtained after stage 3), noted $d_{50}$;
- the dry extract of the final suspension obtained after stage 3) noted DE;
- the Brookfield™ viscosities, measured at 10 RPM and at 25° C., of the final suspension obtained after stage 3), at instant t=0 and noted $V_B(t_0)$, and at instant t=8 days after stirring, noted $V_B(t_8)$.

All these results, the principal characteristics of the co-grinding agents used for co-grinding of GCC and PCC, and the characteristics of the dispersing agents used for dispersion of the PCC, are reported in table 3.

TABLE 3

| | | test No. | | | | | | |
|---|---|---|---|---|---|---|---|---|
| | | 12 | 13 | 14 | 15 | 16 | 17 | 18 |
| Invention excluding embodiment (IEV)/Embodiment of the Invention (VI) | | IEV | IEV | IEV | VI | VI | VI | VI |
| PCC dispersion agent used during stage 1b) | nature | aa | aa | aa | aa | aa | aa | aa |
| | neutralisation | 50 Na 50 Mg | 100 Na | 100 Na | 100 Na | 100 Na | 100 Na | 90 Na |
| | $M_w$ (g/mole) | 5,700 | 4,500 | 5,500 | 12,000 | 12,000 | 13,000 | 12,000 |
| | $I_p$ | 2.2 | 2.2 | 2.4 | 2.2 | 2.2 | 2.2 | 2.2 |
| co-grinding agent of GCC and PCC used during stages 2) and 3) | nature | aa | aa | aa | aa | aa | aa | aa |
| | neutralisation | 37 Na | 14 Na | 14 Na | 14 Na | 26 Na | 26 Na | 14 Na |
| | $M_w$ (g/mole) | 5,600 | 5,600 | 5,600 | 5,600 | 5,800 | 5,800 | 5,600 |
| | $I_p$ | 2.2 | 2.4 | 2.4 | 2.4 | 2.15 | 2.15 | 2.4 |
| suspension of GCC and PCC obtained after stage 3) | % <µm | 97.9 | 98.8 | 99.4 | 98.9 | 98.6 | 98.6 | 98.7 |
| | $d_{50}$ (µm) | 0.306 | 0.305 | 0.31 | 0.3 | 0.298 | 0.3 | 0.3 |
| | DE (%) | 72 | 73 | 73.7 | 74 | 74 | 74 | 74 |
| | $V_B(t_0)$ (mPa·s) | 4,900 | 4,900 | 4,200 | 1,400 | 2,700 | 2,750 | 1,450 |
| | $V_B(t_8)$ (mPa·s) | 34,900 | 35,700 | 20,400 | 11,800 | 3,800 | 3,850 | 12,000 | characteristics of the co-grinding agents of GCC and PCC and of the dispersion agents of PCC used, with:
- "nature" designating the chemical nature of the said agent, and notably as designating a homopolymer of acrylic acid;
- "neutralisation" indicating the molar percentage of the neutralised acid functions (number) and the nature of the neutralisation ion (chemical symbol according to number)
- "$M_w$" designating the molecular weight by mass of the said agent;
- "$I_p$" designating the polydispersity index of the said agent;

characteristics of the aqueous suspensions of GCC and PCC obtained after the stage of concentration, with:
- "%<1 µm" designating the percentage by weight of particles of GCC and PCC having a diameter of less than 1 µm;
- "$d_{50}$" designating the median diameter of the particles of natural and precipitated calcium carbonates;
- "DE (%)" designating the dry extract of the suspension (in % by dry weight of particles of GCC and PCC);
- "$V_B(t_0)$" and "$V_B(t_8)$" designating respectively the Brookfield™ viscosities, measured at 10 RPM and at 25° C., at instant t=0 and at instant t=8 days after stirring.

These results therefore demonstrate that the co-grinding agents of the invention enable the technical problem posed to the skilled man in the art to be resolved, namely:
- obtaining for the final suspension of co-ground GCC and PCC a dry extract greater than 70%, preferentially greater than 72%, and very preferentially greater than 74% (by weight of mineral particles relative to the total weight of the suspension);
- obtaining for this same suspension a Brookfield™ viscosity measured after the stage of co-grinding (at 25° C. and at 10 RPM) of less than 5,000 mPa·s, preferentially less than 3,000 mPa·s, and very preferentially less than 2,000 mPa·s, and a Brookfield™ viscosity measured 8 days after the stage of co-grinding and after stirring (at 25° C. and at 10 RPM) of less than 50,000 mPa·s, preferentially less than 30,000 mPa·s, and very preferentially less than 20,000 mPa·s;
- obtaining, in this same suspension, particles of calcium carbonate the median diameter of which is less than 0.7 µm, and preferentially less than 0.3 µm.

These results also demonstrate that of particular dispersing agents for PCC which are homopolymers of acrylic acid, combining all the following characteristics:
- a molar neutralisation rate of the acid functions greater than 80%, preferentially greater than 90%, of the totality of the acid functions, and very preferentially in that it is totally neutralised;
- a molecular weight of between 10,000 g/mole and 15,000 g/mole, and preferentially between 12,000 g/mole and 14,000 g/mole;
- a polydispersity index of between 1.5 and 2.5;

enable the values of the Brookfield™ viscosities of suspensions of co-ground GCC and PCC according to the embodiment of the invention, relative to these suspensions obtained without using the embodiment of the invention, whilst retaining values of $d_{50}$ less than or equal to 0.3 µm and dry extract values greater than or equal to 74% of the total weight of the suspensions.

The Applicant adds that the skilled man in the art may choose to add to the final suspension of GCC and PCC obtained after stage 3), a viscosity regulating agent. This can notably be a zirconium-based compound, such as a compound of the AZC (ammonium zirconium carbonate) or KZC (potassium zirconium carbonate) type, commercial examples of such compounds being, for example, Zirmel™ and Bacote™ products sold by the company MEL CHEMICALS™.

Example 4

This example illustrates the use, in process of manufacture of co-ground GCC and PCC comprising the stages of:
1. preparation
   (a) of an aqueous suspension of GCC, with a grinding aid agent,
   (b) and of an aqueous suspension of PCC, comprising a dispersing agent,
2. co-grinding of the said aqueous suspensions of GCC and PCC, as prepared in stage 1),
3. concentration of the aqueous suspension of the co-ground natural and precipitated calcium carbonates, as obtained after stage 2), of a co-grinding agent according to the invention, where the said agent is introduced partly during stage 2), and during stage 3).

This example illustrates the case of a GCC:PCC ratio during the co-grinding stage equal to 50:50.

This example also illustrates the preferential embodiment which lies in the use, during stage 1b) of preparation of the suspension of PCC, of dispersing agents of the PCC which are homopolymers of acrylic acid, combining all the following characteristics:

a molar neutralisation rate of the acid functions greater than 80%, and preferentially greater than 90%, of the totality of the acid functions, and the said agent is very preferentially totally neutralised;

a molecular weight of between 10,000 g/mole and 15,000 g/mole, and preferentially between 12,000 g/mole and 14,000 g/mole;

a polydispersity index of between 1.5 and 2.5.

Finally, this example also illustrates the aqueous suspensions of co-ground GCC and PCC according to the invention.

According to stage 1a) of the said process, one begins by preparing an aqueous suspension of GCC according to the methods well known to the skilled man in the art, using 0.27% by dry weight relative to the dry weight of GCC of a polyacrylate.

This suspension:
has a dry extract equal to 74.6% (expressed as a percentage by dry weight of GCC relative to the total weight of the suspension);
has granulometric characteristics such that 40.3% by weight of the particles of GCC have a diameter of less than 1 μm, 61.6% by weight of the particles of GCC have a diameter of less than 2 μm, and such that the median diameter of the said particles of GCC is equal to 1.4 μm.

According to stage 1b) of the said process, an aqueous suspension of PCC is also prepared according to the methods well known to the skilled man in the art.

This suspension:
has a dry extract equal to 14.1% (expressed as a percentage by dry weight of PCC relative to the total weight of the suspension);
has granulometric characteristics such that 83.3% by weight of the particles of PCC have a diameter of less than 1 μm, 97.8% by weight of the particles of PCC have a diameter of less than 2 μm, and such that the median diameter of the said particles of PCC is equal to 0.58 μm;
and contains a dispersing agent (which illustrates the preferential embodiment of the invention) in a quantity equal to 0.54% by dry weight of the said agent relative to the dry weight of PCC.

According to stage 2) of the said process, both suspensions are then co-ground according to the methods well known to the skilled man in the art.

The GCC:PCC ratio by dry weight during this stage is equal to 50:50.

During this stage a quantity of co-grinding agent equal to 0.5% by dry weight relative to the total dry weight of GCC and PCC is introduced.

According to stage 3) of the said process, the aqueous suspension of co-ground GCC and PCC obtained after stage 2) is concentrated, by introducing the same agent as the one used during the co-grinding stage; the quantity of the said agent used during the stage of concentration is equal to 0.15% by dry weight relative to the total dry weight of GCC and PCC.

Test No. 19

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% of the acid functions are neutralised by potassium hydroxide, of molecular weight equal to 10,000 g/mole and of polydispersity index equal to 2.29.

It also uses, during stages 2) and 3), a grinding agent which is a homopolymer of acrylic acid, of which 37% by mole of the acid functions are neutralised by sodium hydroxide, of molecular weight equal to 5,800 g/mole and of polydispersity index equal to 2.15.

Test No. 20

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index equal to 2.4.

It also uses, during stages 2) and 3), a co-grinding agent which is a homopolymer of acrylic acid, of which 37% of the acid functions are neutralised by sodium hydroxide, of molecular weight equal to 5,800 g/mole and of polydispersity index equal to 2.15.

Test No. 21

This test illustrates the invention, and illustrates the preferential embodiment which consists in the use of a particular dispersion agent for PCC, as defined in the introduction of this example.

It uses, during stage 1b of preparation of the suspension of PCC, a homopolymer of acrylic acid, of which 100% by mole of the acid functions are neutralised by sodium hydroxide, of molecular weight equal to 12,000 g/mole and of polydispersity index equal to 2.4.

it also uses, during stages 2) and 3), a co-grinding agent which is a homopolymer of acrylic acid, of which 37% of the acid functions are neutralised by sodium hydroxide, of molecular weight equal to 4,900 g/mole and of polydispersity index equal to 2.13.

For each of the tests No, 19 to 21, the same parameters as those measured for the previous examples are then measured. All these results, the principal characteristics of the co-grinding agents used for co-grinding of GCC and PCC, and the characteristics of the dispersing agents used for dispersion of the PCC, are reported in table 4.

TABLE 4

|  |  | test No. | | |
| --- | --- | --- | --- | --- |
|  |  | 19 | 20 | 21 |
| PCC dispersion agent used during stage 1b) | nature | aa | aa | aa |
|  | neutralisation | 100 K | 100 Na | 100 Na |
|  | $M_w$ (g/mole) | 10,000 | 12,000 | 12,000 |
|  | $I_p$ | 2.29 | 2.4 | 2.4 |
| co-grinding agent of GCC and of PCC used during stages 2) and 3) | nature | aa | aa | aa |
|  | neutralisation | 37 Na | 37 Na | 37 Na |
|  | $M_w$ (g/mole) | 5,800 | 5,800 | 4,900 |
|  | $I_p$ | 2.15 | 2.15 | 2.13 |
| suspension of GCC and PCC obtained after stage 3) | % < 1 μm | 97.6 | 96.1 | 96.3 |
|  | $d_{50}$ (μm) | 0.295 | 0.295 | 0.29 |
|  | DE (%) | 74 | 74 | 74 |
|  | $V_B(t_o)$ (mPa·s) | 1,400 | 3,600 | 3,200 |
|  | $V_B(t_8)$ (mPa·s) | 3,500 | 9,900 | 9,300 | characteristics of the co-grinding agents of GCC and PCC, of the dispersion agents of PCC, of the aqueous suspensions of GCC and PCC obtained after the stage of concentration, with the abbreviations as defined in the previous examples.

These results therefore demonstrate that the co-grinding agents of the invention, in combination with the particular dispersion agents of PCC of the invention, enable the technical problem posed for the skilled man in the art, as previously explained, to be resolved.

These combinations enable the Brookfield™ viscosities of the suspensions of GCC and PCC, co-ground according to the embodiment of the invention, to be improved appreciably, whilst maintaining values of $d_{50}$ less than or equal to 0.3 µm, and dry extract values equal to 74% of the total weight of the suspensions.

Example 5

This example illustrates the use, in the process of manufacture of co-ground GCC and PCC comprising the stages of:
1. preparation
   (a) of an aqueous suspension of GCC, with a grinding aid agent,
   (b) and of an aqueous suspension of PCC, comprising a dispersing agent,
2. co-grinding of the said aqueous suspensions of GCC and PCC, as prepared in stage 1),
3. concentration of the aqueous suspension of the co-ground natural and precipitated calcium carbonates, as obtained after stage 2),
of a co-grinding agent according to the invention, introduced during stage 2).

This example illustrates the case of a GCC:PCC ratio during the co-grinding stage equal to 50:50.

This example also illustrates the preferential embodiment which lies in the use, during stage 1b) of preparation of the suspension of PCC, of dispersing agents of the PCC which are homopolymers of acrylic acid, combining all the following characteristics:
   a molar neutralisation rate of the acid functions greater than 80%, and preferentially greater than 90%, of the totality of the acid functions, and the said agent is very preferentially totally neutralised;
   a molecular weight of between 10,000 g/mole and 15,000 g/mole, and preferentially between 12,000 g/mole and 14,000 g/mole;
   a polydispersity index of between 1.5 and 2.5.

Finally, this example also illustrates the aqueous suspensions of co-ground GCC and PCC according to the invention.

According to stage 1a) of the said process, one begins by preparing an aqueous suspension of GCC according to the methods well known to the skilled man in the art, using 0.27% by dry weight relative to the dry weight of GCC of a polyacrylate.

This suspension:
   has a dry extract equal to 74.5% (expressed as a percentage by dry weight of GCC relative to the total weight of the suspension);
   has granulometric characteristics such that 43.2% by weight of the particles of GCC have a diameter of less than 1 µm, and such that the median diameter of the said particles of GCC is equal to 1.2 µm.

According to stage 1b) of the said process, an aqueous suspension of PCC is also prepared according to the methods well known to the skilled man in the art.

This suspension:
   has a dry extract equal to 51.5% (expressed as a percentage by dry weight of PCC relative to the total weight of the suspension);
   has granulometric characteristics such that 65.6% by weight of the particles of PCC have a diameter of less than 1 µm, and such that the median diameter of the said particles of PCC is equal to 0.82 µm;
   and contains a dispersing agent (which illustrates the preferential embodiment of the invention) in a quantity equal to 0.70% by dry weight of the said agent relative to the dry weight of PCC.

According to stage 2) of the said process, both suspensions are then co-ground according to the methods well known to the skilled man in the art.

The GCC:PCC ratio by dry weight during this stage is equal to 50:50.

During this stage a quantity of co-grinding agent equal to 0.8% by dry weight relative to the total dry weight of GCC and PCC is introduced.

According to stage 3) of the said process, the aqueous suspension of co-ground GCC and PCC obtained after stage 2) are concentrated.

Test No. 22

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index, equal to 2.4.

It also uses, during stage 2), a co-grinding agent which is a homopolymer of acrylic acid, which is non-neutralised, of molecular weight equal to 5,600 g/mole and of polydispersity index equal to 2.16.

Test No. 23

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index equal to 2.4.

It also uses, during stage 2), a co-grinding agent which is a blend, 38% of the acid functions of which are neutralised by sodium hydroxide:
   of 83% by dry weight of a homopolymer of acrylic acid, of molecular weight equal to 5,600 g/mole and of polydispersity index equal to 2.4,
   of 17% by dry weight of a homopolymer of acrylic acid obtained by RAFT polymerisation (according to the method as described in document FR 2 821 620), of molecular weight equal to 7,600 g/mole and of polydispersity index equal to 1.68.

Test No. 24

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index equal to 2.4.

It also uses, during stage 2), a co-grinding agent which is a blend:
- of 50% by dry weight of a homopolymer of acrylic acid, non-neutralised, of molecular weight equal to 5,600 g/mole and of polydispersity index equal to 2.16,
- and of 50% by dry weight of a blend, 38% of the acid functions of which are neutralised by sodium hydroxide, the said blend consisting:
  - of 83% by dry weight of a homopolymer of acrylic acid, of molecular eight equal to 5,600 g/mole and of polydispersity index equal to 2.4,
  - of 17% by dry weight of a homopolymer of acrylic acid obtained by RAFT polymerisation (according to the method as described in document FR 2 821 620), of molecular weight equal to 7,600 g/mole and of polydispersity index equal to 1.68.

For each of the tests No. 22 to 24, the same parameters as those measured for the previous examples are then measured. All these results are shown in table 5.

TABLE 5

|  |  | test No. | | |
| --- | --- | --- | --- | --- |
|  |  | 22 | 23 | 24 |
| suspension of GCC and PCC obtained after stage 3) | % < 1 µm | 96.8 | 97.4 | 97.4 |
|  | $d_{50}$ (µm) | 0.286 | 0.287 | 0.283 |
|  | DE (%) | 71.7 | 72.3 | 71.6 |
|  | $V_B (t_o)$ (mPa·s) | 2,100 | 1,900 | 1,870 |
|  | $V_B (t_8)$ (mPa·s) | 5,200 | 6,600 | 5,700 | characteristics of the aqueous suspensions of GCC and PCC obtained after the stage of concentration, with the abbreviations as defined in the previous examples.

These results therefore demonstrate that the co-grinding agents of the invention, in combination with the particular dispersion agents of PCC of the invention, enable the technical problem posed for the skilled man in the art, as previously explained, to be resolved.

Example 6

This example illustrates the use, in the process of manufacture of co-ground GCC and PCC comprising the stages of:
1. preparation
   (a) of an aqueous suspension of GCC, with a grinding aid agent,
   (b) and of an aqueous suspension of PCC, comprising a dispersing agent,
2. co-grinding of the said aqueous suspensions of GCC and PCC, as prepared in stage 1),
3. concentration of the aqueous suspension of the co-ground natural and precipitated calcium carbonates, as obtained after stage 2), of a co-grinding agent according to the invention, introduced during stage 2) and during stage 3).

This example illustrates the case of a GCC:PCC ratio during the co-grinding stage equal to 50:50.

This example also illustrates the preferential embodiment which lies in the use, during stage 1b) of preparation of the suspension of PCC, of dispersing agents of the PCC which are homopolymers of acrylic acid, combining all the following characteristics:
- a molar neutralisation rate of the acid functions greater than 80%, and preferentially greater than 90%, of the totality of the acid functions, and the said agent is very preferentially totally neutralised;
- a molecular weight of between 10,000 g/mole and 15,000 g/mole, and preferentially between 12,000 g/mole and 14,000 g/mole;
- a polydispersity index of between 1.5 and 2.5.

Finally, this example also illustrates the aqueous suspensions of co-ground GCC and PCC according to the invention.

According to stage 1a) of the said process, one begins by preparing an aqueous suspension of GCC according to the methods well known to the skilled man in the art, using 0.27% by dry weight of a polyacrylate relative to the dry weight of GCC.

This suspension:
- has a dry extract equal to 74.6% (expressed as a percentage by dry weight of GCC relative to the total weight of the suspension);
- has granulometric characteristics such that 40.3% by weight of the particles of GCC have a diameter of less than 1 µm, and such that the median diameter of the said particles of GCC is equal to 1.4 µm.

According to stage 1b) of the said process, an aqueous suspension of PCC is also prepared according to the methods well known to the skilled man in the art.

This suspension:
- has a dry extract equal to 13.1% (expressed as a percentage by dry weight of PCC relative to the total weight of the suspension);
- has granulometric characteristics such that 19.9% by weight of the particles of PCC have a diameter of less than 1 µm, and such that the median diameter of the said particles of PCC is equal to 1.43 µm;
- and contains a dispersing agent (which illustrates the preferential embodiment of the invention) in a quantity equal to 0.54% by dry weight of the said agent relative to the dry weight of PCC.

According to stage 2) of the said process, both suspensions are then co-ground according to the methods well known to the skilled man in the art.

The GCC:PCC ratio by dry weight during this stage is equal to 50:50.

During this stage a quantity of co-grinding agent equal to 0.50% by dry weight relative to the total dry weight of GCC and PCC used is introduced, followed by 0.15% of the same agent or of another agent during stage 3).

According to stage 3) of the said process, the aqueous suspension of GCC and PCC in the presence of 0.15% by dry weight of a co-grinding agent which is the same as the one used during stage 2) is concentrated.

Test No. 25

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index equal to 2.3.

It also uses, during stages 2) and 3), a co-grinding agent which is a homopolymer of acrylic acid, which is non-neutralised, of molecular weight equal to 5,600 g/mole and of polydispersity index equal to 2.09.

Test No. 26

This test illustrates the invention, and illustrates the preferential embodiment which consists in the use of a particular dispersion agent for PCC, as defined in the introduction of this example.

It uses, during stage 1b) of preparation of the suspension of PCC, a copolymer (acrylic acid:methacrylic acid) (90:10 by weight), obtained by RAFT polymerisation (according to the method as described in document FR 2 821 620), 100% of the acid functions by mole of which are neutralised by sodium hydroxide, of molecular weight equal to 12,000 g/mole, and of polydispersity index equal to 1.8.

It also uses, during stages 2) and 3), a co-grinding agent which is a homopolymer of acrylic acid, which is non-neutralised, of molecular weight equal to 5,600 g/mole and of polydispersity index equal to 2.09.

Test No. 27

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index equal to 2.3.

It also uses, during stages 2) and 3), a co-winding agent which is a copolymer (acrylic acid:propylene glycol methacrylate phosphate) (90:10 by weight, 40% of the acid functions of which are neutralised by sodium hydroxide, of molecular weight equal to 5,000 g/mole and of polydispersity index equal to 2.45.

Test No. 28

This test illustrates the invention, and illustrates the preferential embodiment which consists in the use of a particular dispersion agent for PCC, as defined in the introduction of this example.

It uses, during stage 1b) of preparation of the suspension of PCC, a homopolymer of acrylic acid, of which 100% by mole of the acid functions are neutralised by sodium hydroxide, of molecular weight equal to 12,000 g/mole and of polydispersity index equal to 2.3.

It also uses, during stages 2) and 3), a co-grinding agent which is a copolymer (acrylic acid:methacrylic acid) (90:10 by weight), 40% of the acid functions of which are neutralised by sodium hydroxide, of molecular weight equal to 5,000 g/mole and of polydispersity index equal to 2.45.

For each of the tests No. 25 to 28, the same parameters as those measured for the previous examples are then measured. All these results, the principal characteristics of the co-grinding agents used for co-grinding of GCC and FCC, and the characteristics of the dispersing agents used for dispersion of the PCC, are reported in table 6.

TABLE 6

|  |  | test No. | | | |
|---|---|---|---|---|---|
|  |  | 25 | 26 | 27 | 28 |
| PCC dispersion agent used during stage 1b) | nature | aa | aa/ama | aa | aa |
|  | neutralisation | 100 Na | 100 Na | 100 Na | 100 Na |
|  | $M_w$ (g/mole) | 12,000 | 12,000 | 12,000 | 12,000 |
|  | $I_p$ | 2.3 | 1.8 | 2.3 | 2.3 |
| co-grinding agent of GCC and of PCC used during stages 2) and 3) | nature | aa | aa | aa/po4maeg | aa/ama |
|  | neutralisation | 0 | 0 | 40 Na | 40 Na |
|  | $M_w$ (g/mole) | 5,600 | 5,600 | 5,000 | 5,000 |
|  | $I_p$ | 2.09 | 2.09 | 2.45 | 2.45 |
| suspension of GCC and PCC obtained after stage 3) | % < 1 μm | 97.5 | 97.1 | 97.7 | 97.4 |
|  | $d_{50}$ (μm) | 0.292 | 0.292 | 0.299 | 0.293 |
|  | DE (%) | 73.7 | 73.9 | 74.0 | 74.0 |
|  | $V_B(t_o)$ (mPa·s) | 3,300 | 1,400 | 2,000 | 2,000 |
|  | $V_B(t_8)$ (mPa·s) | 4,100 | 1,700 | 4,800 | 4,300 | characteristics of the co-grinding agents of GCC and PCC, of the dispersion agents of PCC, of the aqueous suspensions of GCC and PCC obtained after the stage of concentration, with the abbreviations as defined in the previous examples, and with:

aa/ama:copolymer (acrylic acid:methacrylic acid) (90/10 by weight), aa/po4maeg:copolymer (acrylic acid:propylene glycol methacrylate phosphate) (90:10 by weight).

These results therefore demonstrate that the co-grinding agents of the invention, in combination with the particular dispersion agents of PCC of the invention, enable the technical problem posed for the skilled man in the art, as previously explained, to be resolved.

The invention claimed is:

1. A co-ground GCC and PCC composition comprising GCC, PCC and at least one co-grinding agent of GCC and PCC, wherein the co-grinding agent is at least one homopolymer of acrylic acid and/or at least one copolymer of acrylic acid, which is partially neutralized, and of which 50% or less by mole of the total acid functions are neutralized, wherein the co-grinding agent has a molecular weight of 4,000-10,000 g/mole, and wherein the co-grinding agent has a polydispersity index of 1.5-2.5.

2. The composition according to claim 1, which is an aqueous suspension.

3. The composition according to claim 1, which is a dry pigment.

4. The composition according to claim 1, which comprises 0.5% to 2% by dry weight of the co-grinding agent relative to the total weight of GCC and PCC.

5. The composition according to claim 1, wherein the co-grinding agent has a molar neutralization rate of the acid functions of less than 20% of the totality of the acid functions.

6. The composition according to claim 1, wherein the co-grinding agent is neutralized by sodium hydroxide, potassium hydroxide, carbonate, acid carbonate, calcium hydroxide, magnesium hydroxide, calcium oxide, magnesium oxide, ammonium hydroxide or their blends.

7. The composition according to claim 1, wherein the co-grinding agent is neutralized by sodium hydroxide.

8. The composition according to claim 1, wherein the co-grinding agent is a copolymer of acrylic acid and at least one monomer other than acrylic acid chosen from ethylenic unsaturation monomers with a monocarboxylic function, ethylenic unsaturation monomers with a dicarboxylic function, ethylenic unsaturation monomers with a sulfonic function, ethylenic unsaturation monomers with a phosphoric function, ethylenic unsaturation monomers with a phosphonic function, or their blends.

9. The composition according to claim 1, wherein the co-grinding agent is a copolymer of acrylic acid and at least one monomer other than acrylic acid chosen from methacrylic acid, diacid hemiesters, $C_1$ to $C_4$ monoesters of the maleic or itaconic acides, or their blends, crotonic, isocrotonic, cinnamic, itaconic or maleic acid, or carboxylic acid anhydrides, maleic anhydride, or 2-acrylamido-2-methyl-propane-sulfonic acid, sodium methallylsulfonate, sulfonic vinyl acid, sulfonic styrene acid, or phosphoric vinyl acid, ethylene glycol methacrylate phosphate, propylene glycol methacrylate phosphate, ethylene glycol acrylate phosphate, propylene glycol acrylate phosphate and their ethoxylates, or phosphonic vinyl acid, or their blends.

10. The composition according to claim 1, which further comprises at least one dispersing agent of PCC, wherein the dispersing agent is a homopolymer and/or a copolymer of acrylic acid, combining all the following characteristics:
- a molar neutralization rate of the acid functions of greater than 80% of the totality of the acid functions;
- a molecular weight of between 10,000 g/mole and 15,000 g/mole; and
- a polydispersity index of between 1.5 and 2.5.

11. The composition according to claim 10, wherein the at least one dispersing agent is characterized as having totally neutralized acid functions.

12. The composition according to claim 10, which comprises 0.5% to 2% by dry weight of the dispersion agent of PCC relative to the dry weight of PCC.

13. The composition according to claim 10, wherein the dispersion agent of PCC is neutralized by sodium hydroxide.

14. The composition according to claim 10, wherein the dispersing agent is a copolymer of acrylic acid and at least one monomer other than acrylic acid chosen from ethylenic unsaturation monomers with a monocarboxylic function, ethylenic unsaturation monomers with a dicarboxylic function, ethylenic unsaturation monomers with a sulfonic function, ethylenic unsaturation monomers with a phosphoric function, ethylenic unsaturation monomers with a phosphonic function, or their blends.

15. The composition according to claim 10, wherein the dispersing agent is a copolymer of acrylic acid and at least one monomer other than acrylic acid chosen from methacrylic acid, diacid hemiesters, $C_1$ to $C_4$ monoesters of the maleic or itaconic acides, or their blends, crotonic, isocrotonic, cinnamic, itaconic or maleic acid, or carboxylic acid anhydrides, maleic anhydride, or 2-acrylamido-2-methyl-propane-sulfonic acid, sodium methallylsulfonate, sulfonic vinyl acid, sulfonic styrene acid, or phosphoric vinyl acid, ethylene glycol methacrylate phosphate, propylene glycol methacrylate phosphate, ethylene glycol acrylate phosphate, propylene glycol acrylate phosphate and their ethoxylates, or phosphonic vinyl acid, or their blends.

16. The composition according to claim 1, comprising between 10 and 90% dry weight of PCC relative to the total weight of GCC and PCC.

17. The composition according to claim 2, comprising greater than 70% by total dry weight of PCC and GCC.

18. The composition according to claim 1, wherein the particles of GCC and PCC have a distribution factor of greater than 30.

19. The composition according to according to claim 1, wherein the particles of GCC and PCC have a median diameter of less than 0.7 μm.

20. A paper, paint, rubber or plastic comprising the composition according to claim 1.

* * * * *